(12) United States Patent
Gunturi et al.

(10) Patent No.: US 8,848,813 B2
(45) Date of Patent: Sep. 30, 2014

(54) OFDM PAR REDUCTION BY SUBSTITUTING ORIGINAL IN-BAND SUBCARRIERS AFTER CLIPPING

(71) Applicant: Texas Instruments Incorporated, Dallas, TX (US)

(72) Inventors: Sarma S Gunturi, Bangalore (IN); Atul Deshpande, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 16 days.

(21) Appl. No.: 13/710,120

(22) Filed: Dec. 10, 2012

(65) Prior Publication Data
US 2014/0161202 A1    Jun. 12, 2014

(51) Int. Cl.
*H04K 1/10* (2006.01)
*H04L 27/26* (2006.01)

(52) U.S. Cl.
CPC ................................ *H04L 27/2623* (2013.01)
USPC ........... 375/260; 375/295; 375/296; 370/210; 370/344; 370/480; 341/173; 341/180; 455/108

(58) Field of Classification Search
CPC   H03G 11/00; H04L 27/2623; H04L 27/2624; H04L 27/2636; H04B 1/707; H04B 2201/70706; H04B 1/0475
USPC .......... 375/260, 295, 296; 370/210, 344, 480; 455/108; 341/173, 180
See application file for complete search history.

(56) References Cited

U.S. PATENT DOCUMENTS

| | | | | |
|---|---|---|---|---|
| 7,187,722 | B2* | 3/2007 | Peeters .......................... | 375/296 |
| 8,098,744 | B2 | 1/2012 | Chen et al. | |
| 2004/0234006 | A1* | 11/2004 | Leung ............................ | 375/316 |
| 2006/0126748 | A1* | 6/2006 | Lin et al. ....................... | 375/260 |
| 2006/0140296 | A1 | 6/2006 | Cleveland et al. | |
| 2007/0195909 | A1* | 8/2007 | Ishikawa et al. .............. | 375/285 |
| 2008/0089439 | A1 | 4/2008 | Piirainen | |
| 2010/0097923 | A1* | 4/2010 | Zhao et al. .................... | 370/210 |
| 2011/0092173 | A1* | 4/2011 | McCallister et al. .......... | 455/108 |

FOREIGN PATENT DOCUMENTS

WO    2008058143   A2    5/2008

\* cited by examiner

*Primary Examiner* — Leon Flores
(74) *Attorney, Agent, or Firm* — Lawrence J. Bassuk; Frederick J. Telecky, Jr.

(57) ABSTRACT

A peak-to-average ratio (PAR) of a signal is reduced by clipping the signal at a threshold level and replacing desired frequency tones of the clipped signal with set of frequency tones of the signal. In one embodiment, the PAR of a signal is reduced by adding a peak cancellation signal to the received signal. The peak cancellation signal is generated by clipping the received signal at a threshold level and generating a difference signal by subtracting the received signal from the clipped signal. The peak cancellation signal thus generated is scaled by a scaling factor and added to the received signal to reduce the PAR of the received signal. The scaling factor is adjusted to maintain the desired quality of the received signal. In one embodiment, the PAR of an orthogonal frequency division multiplexed (OFDM) signal may be reduced.

6 Claims, 8 Drawing Sheets

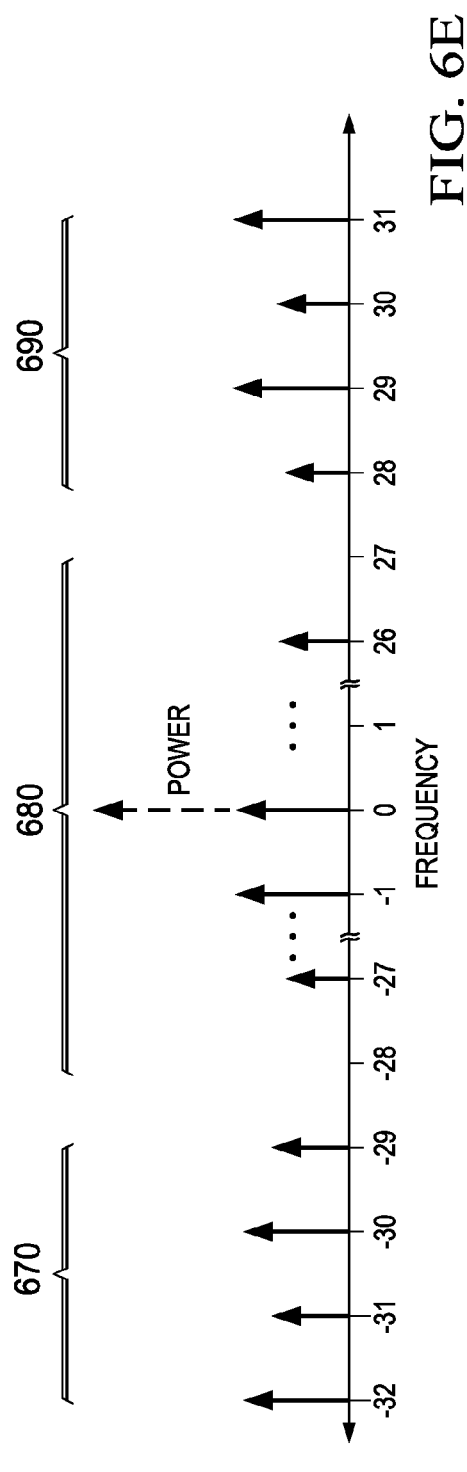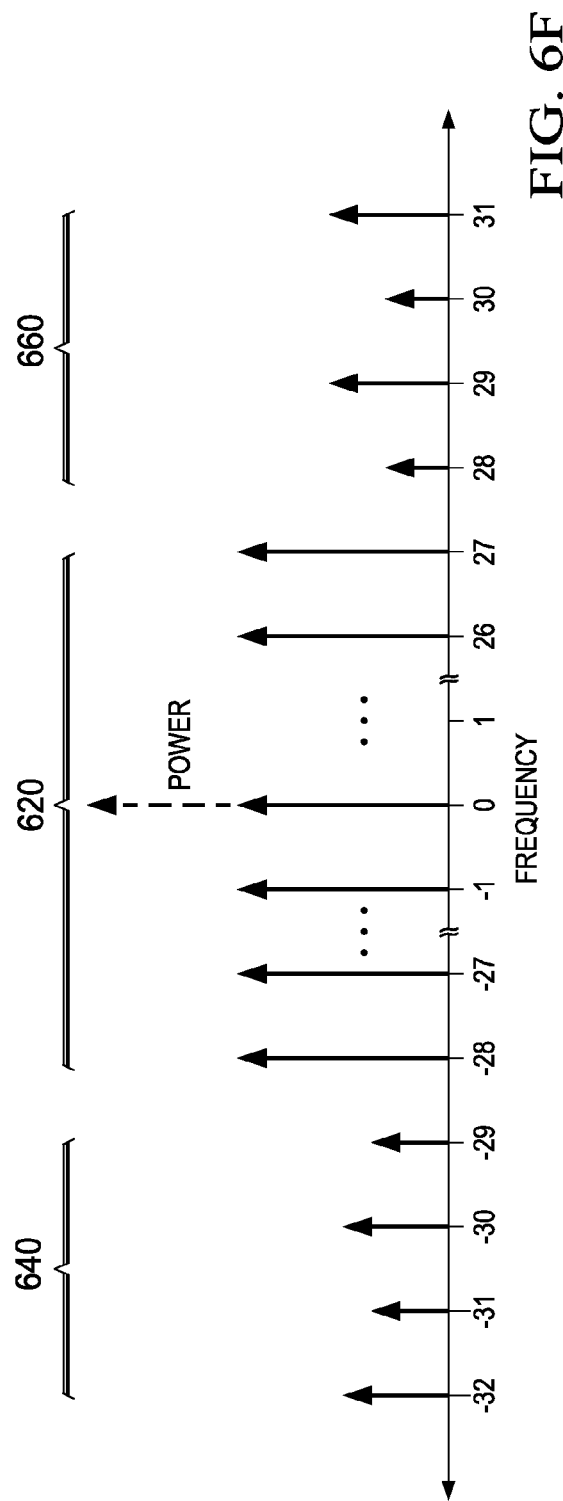

OFDM PAR REDUCTION BY SUBSTITUTING ORIGINAL IN-BAND SUBCARRIERS AFTER CLIPPING

TECHNICAL FIELD

The present disclosure relates generally to processing of a signal and more specifically to reducing the peak-to-average ratio of a signal.

RELATED ART

Peak-to-average ratio (PAR) of a signal often refers to the ratio of peak instantaneous power to the average power, as measured over a period of time (or time window). Alternatively, the peak-to-average ratio also refers to peak amplitude of the signal envelope to the average amplitude of the signal envelope measured over a period of time. In general, peak-to-average ratio represents the characteristic of the signal variations. For example, a signal with a high peak-to-average ratio may contain rare/occasional peaks, spikes or overshoots.

In general, a signal having high peak-to-average ratio causes inefficiencies in processing the signal. For example, a power amplifier that amplifies a signal having a high peak-to-average ratio often works with low efficiency. Similarly, in case of an analog-to-digital (A/D) converter that converts a high PAR analog signal to digital form, the entire dynamic range of the A/D converter is not efficiently utilized.

SUMMARY

According to an aspect of the present disclosure, the PAR of a signal is reduced by clipping the signal at a threshold level and replacing selected frequency tones of the clipped signal with a set of frequency tones of the signal.

According to another aspect of the present disclosure, the PAR of a signal is reduced by adding a peak cancellation signal to the received signal. The peak cancellation signal is generated by clipping the received signal at a threshold level to generate a clipped signal. A difference signal is generated by subtracting the received signal from the clipped signal. The peak cancellation signal thus generated is scaled by a scaling factor and added to the received signal to reduce the PAR of the received signal. The scaling factor is adjusted to maintain the desired quality of the received signal.

According to another aspect of the present disclosure, the PAR of an orthogonal frequency division multiplexed (OFDM) signal is reduced by converting subcarriers of the OFDM signal into a time-domain OFDM signal. The time-domain OFDM signal is clipped at a threshold level. The clipped time-domain OFDM signal is converted to frequency tones. In-band frequency tones of the clipped signal are replaced with the original in-band OFDM frequency tones, thereby enhancing the quality of the OFDM signal.

According to another aspect of the present disclosure, both in-band frequency tones and out-of-band frequency tones of the clipped OFDM signal may be scaled to comply with the mask(s) specified in communication standards such as, WLAN (802.11a/b/n/g).

Several embodiments are described below, with reference to diagrams for illustration. It should be understood that numerous specific details are set forth to provide a full understanding of the invention. One skilled in the relevant art, however, will readily recognize that embodiments may be practiced without one or more of the specific details, or with other methods, etc. In other instances, well-known structures or operations are not shown in detail to avoid obscuring the features of the invention.

BRIEF DESCRIPTION OF DRAWINGS

FIGS. 6A-6F represents example OFDM signal at different processing levels.

DETAILED DESCRIPTION

Figure 1:
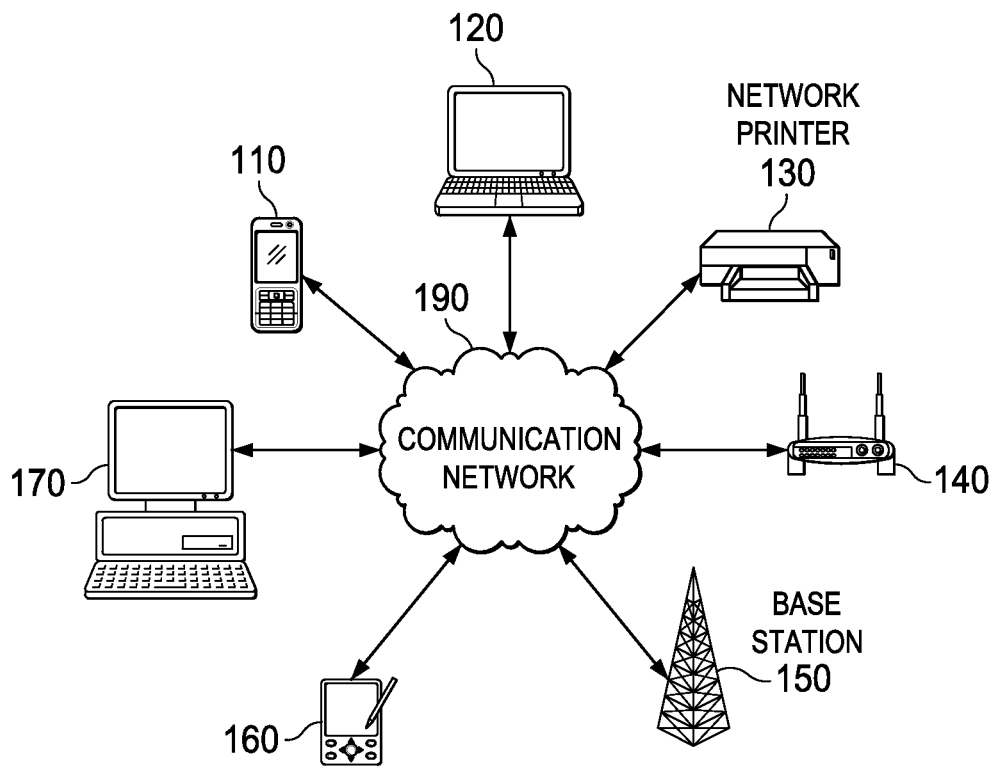
FIG. 1 is an example environment in which various aspects of the present disclosure are seen.

FIG. 1 is an example environment in which various aspects of the present disclosure are seen. As shown, the environment comprises, for example, one or more mobile devices 110, laptops 120, network printers 130, routers 140, base stations 150, PDAs 160 and computers 170. Other wireless or wired devices may be coupled to the communication network 190. The devices 110-170 are coupled to communication network 190. Communication network 190 supports an exchange of data in accordance with the various wireless/wire line communications standards such as, and not limited to, WLAN, WIFI, Bluetooth, dedicated RF channel, GSM, CDMA, OFDM, satellite communication, cable networking, PSTN, DSL etc. Thus, devices 110-170 transmits and receives signal carrying information by processing signals in accordance with one or more such standards. An example sequence of signal processing that may be performed in the devices 110-170 is described in further detail below.

Figure 2:
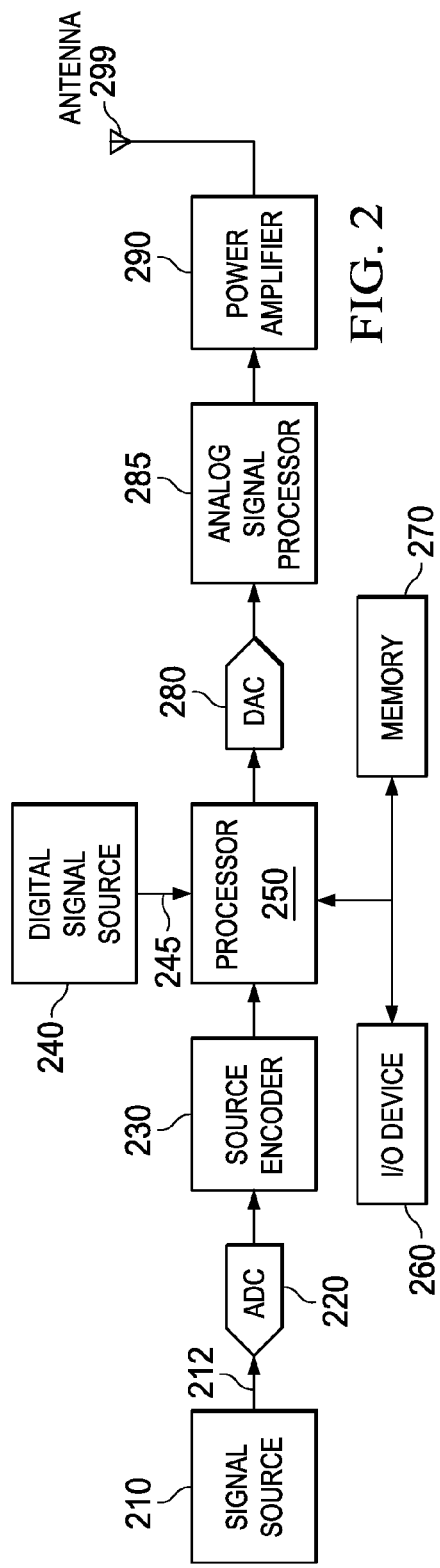
FIG. 2 is block diagram of an example data processing sequence that is performed within one or more of the exemplary devices shown in FIG. 1, in one embodiment.

FIG. 2 is block diagram of an example data processing sequence that may be performed within one or more of the exemplary devices shown in FIG. 1. The block diagram is shown containing signal source 210, A/D converter 220, source encoder 230, digital signal source 240, processor 250, Input/Output (I/O) device 260, memory 270, digital-to-analog (D/A) converter 280, analog signal processor 285, power amplifier 290 and antenna 299. Each block is described in further detail below.

Signal source 210 provides an analog signal on path 212 for processing and transmitting over the communication network 190. In some embodiments, signal source 210 includes analog sources such as, but not limited to, a microphone that generates an audio/speech signal, cameras that generate a video or image signal, and sensors that generate signals representative of temperature variations, pressure variations and/or or other automation signals. Signal source 210 may also include other ancillary systems that acquire the signal from signal sources/sensors and converts them to a suitable format for processing.

A/D converter 220 converts the analog signal received from the signal source 210 to digital values. In one embodiment, the A/D converter 220 samples the input analog value and convert each sample to a digital code, to thereby generate a sequence of digital values that correspond to the continuous analog signal. The dynamic range of the A/D converter 220 is selected suitably to match the dynamic range of the analog signal such that each sampled value is effectively represented by a digital code. A/D converter 220 may be implemented using any known techniques.

Source encoder 230 encodes the sequence of raw digital codes received from A/D converter 220 according to various source encoding standards. For example, source encoder 230 removes any redundancies in the received raw digital codes and improve the efficiency in representing the analog value in digital format. The source encoder 230 may be implemented in consideration with the source signal being encoded, as is known in the relevant art.

Digital signal source 240 provides a digital signal on path 245 for processing and transmitting over the communication network 190. In some embodiments, the digital signal source 240 comprise one or more of processed video signals, compressed video signals, and signals representative of, for example, multimedia, digital documents, data packets, data symbols formed according to one or more modulation techniques such as BPSK, QPSK, QAM, M-ary and the like. Digital signal source 240 may also include other ancillary systems that acquire the signal and convert them to a suitable format for processing. I/O device 260 provides a user an external interface to the processor 250. The processor 250 sends and receives data through the I/O device 260. Memory 270 is coupled to the I/O device 260 and to the processor 250. Memory 270 stores and/or provides data when required for processing.

D/A converter 280 converts a sequence of digital bits to a corresponding analog signal. The converted analog signal is then provided to the analog signal processor 285. The D/A converter may be implemented using any known techniques matching the signal rate, range accuracy etc. Analog signal processor 285 processes the analog signal received from D/A converter 280 for transmitting over the communication network 190. In one embodiment, the analog signal processor 285 performs one or more operations of a filter, mixer, frequency convertor, and operations suitable for transmitting the signal in accordance with the desired communication standard. The processed analog signal is provided to power amplifier 290.

Power amplifier 290 amplifies the received signal to a desired power level for transmission. The transmission of the signal is made through antenna 299. In one embodiment, transmission is made through other transmission apparatus or functionality as part of the communication network 190. The power amplifier 290 is configured to amplify a signal with a particular Peak-to-average ratio (PAR). The efficiency of the power amplifier 290 varies depending on the PAR of the signal being amplified. The manner in which PAR may affect the efficiency of the power amplifier 290 is described below with reference to FIG. 3.

Figure 3:
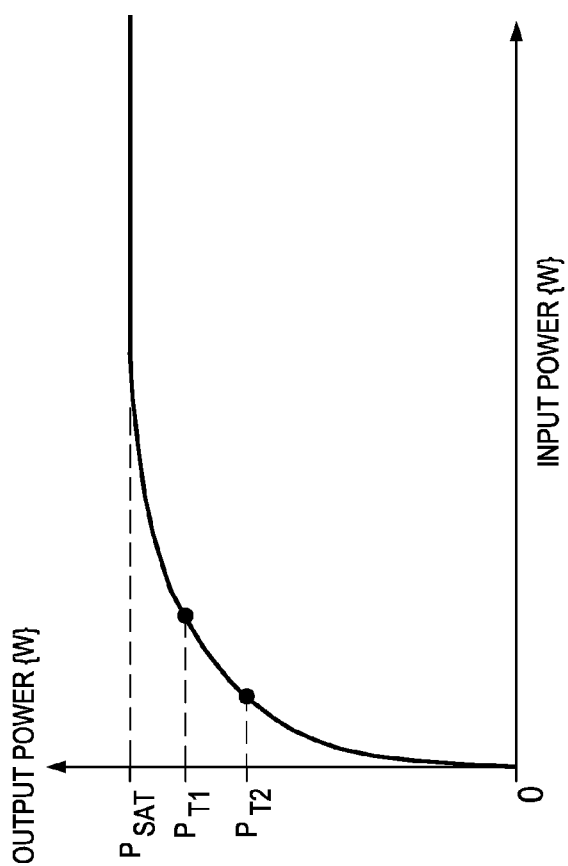
FIG. 3 illustrates an example transfer curve of the power amplifier of FIG. 2.

FIG. 3 illustrates an example transfer curve of the power amplifier 290. The $P_{sat}$ output power level represents the designed saturation power of the power amplifier 290. The $P_{T1}$ output power level represents the transmit power of a signal with a peak-to-average ratio equal to $PAR_1$. The $P_{T2}$ output power level represents the transmit power of a signal with a peak-to-average ratio equal to $PAR_2$ that is greater than $PAR_1$.

As can been seen, the transmit power is set to less than (referred to as "back-off") the $P_{sat}$ for amplifying the signal component. The amount of back-off is determined based on the signal swing or PAR. In general, the higher the PAR of the signal, larger is the back-off. Thus, to achieve a desired transmit power, the $P_{sat}$ of the power amplifier should be set to a correspondingly higher value. A higher $P_{sat}$ results in higher current consumption in the processing chain of FIG. 2. Alternatively, for a fixed $P_{sat}$, the transmit power may decrease with increasing PAR.

The power amplifier may consume a large percentage of power, as compared to other units in the processing chain of FIG. 2. Thus, it is desirable to keep the transmit power closer to $P_{sat}$ by reducing the PAR of the signal being amplified.

In one embodiment processor 250 is configured to reduce the PAR of a signal. The processor 250 receives a signal for reducing PAR for transmission over the communication network 190. In one embodiment, the processor 250 performs various signal processing operations to reduce the PAR of a signal. The processor 250 performs operations such as Fast Fourier Transforms (FFT), Inverse Fast Fourier Transform (IFFT) and/or other signal conditioning operations in accordance with the applicable communication standards. The manner in which the processor 250 may reduce the PAR of the signal is described in further detail below.

Figure 4:
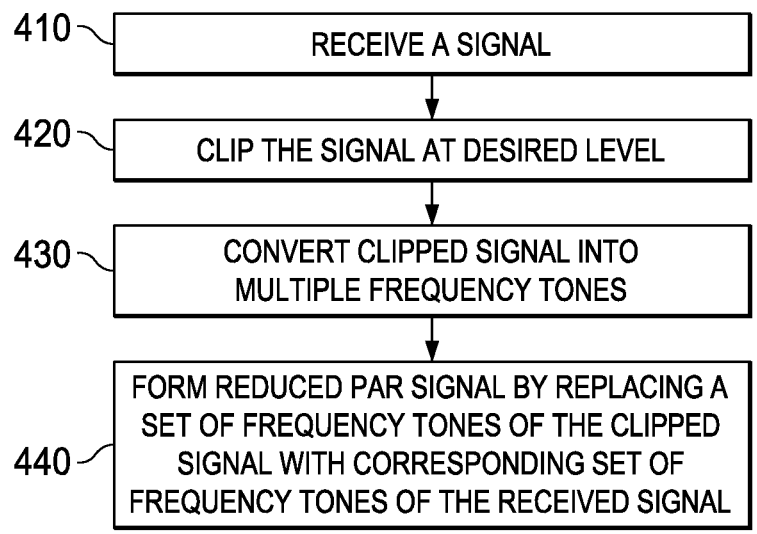
FIG. 4 is a flowchart illustrating the manner in which the PAR of a signal is reduced in an embodiment.

FIG. 4 is flowchart illustrating the manner in which PAR of a signal is reduced, according to one embodiment. In block 410, the processor 250 receives a signal for reducing PAR. In one embodiment, the received signal is in frequency domain. For example, the signal is presented as finite number of discrete frequency tones of varying amplitudes and/or phase. In one alternative embodiment, the received signal is in time domain. For example, the received signal comprises a sequence of analog samples represented in digital bits/codes. If the signal is received in the frequency-domain, the processor 250 converts the frequency-domain representation of the signal to the time-domain using techniques such as Inverse Fourier Transform (IFT), IFFT, Inverse Discrete Cosine Transform (IDCT), etc. On the other hand, if the received signal is in time-domain, the processor 250 converts the signal to frequency tones by applying suitable transform technique for later use.

In block 420, the processor 250 clips the received signal at desired level. In one embodiment, the signal is clipped using digital processing techniques. For example, the processor 250 compares each signal sample (represented in digital bits) with a selected threshold value. The samples exceeding the threshold value are truncated to the selected threshold value. Alternatively, the signal is clipped in the analog domain using any known clipping circuits such as clipper circuits implemented using diodes and capacitors.

In block 430, the processor 250 converts the clipped signal into multiple frequency tones of varying amplitude and/or phase. For example, the clipped signal in time-domain is converted to a number of discrete frequency tones in the frequency-domain. The conversion from time-domain to the frequency-domain, in one embodiment, is performed by applying an FFT. The FFT converts the analog signal to a magnitude and phase component of a desired set of frequency tones. Various other transform techniques such as Fourier transform, Laplace transform, DFT etc., may also be employed for conversion.

In block 440, the processor 250 forms the reduced PAR signal by replacing a set of frequency tones of the clipped signal with a corresponding set of frequency tones of the received signal. In one embodiment, the received signal tones are temporarily buffered or passed through a delay line for replacing with the frequency tones of the clipped signal. For example, the received signal tones in the frequency band, that carry most of the information, are used for replacement.

The frequency tones of the signal with reduced PAR are converted to the time-domain for transmission over the communication network 190. The clipping of the received signal reduces the PAR of the signal while the replacement of the information carrying frequency tones improves the signal quality. In one embodiment, the above technique is implemented in a feed-forward processing configuration without requiring multiple iterations or feedback.

The manner in which the PAR is reduced while keeping the desired signal quality is further described by referring to an example OFDM signal. Such technique may be extended to any other signal types and/or signals modulated using other modulation techniques, as described herein, for example.

Figure 5:
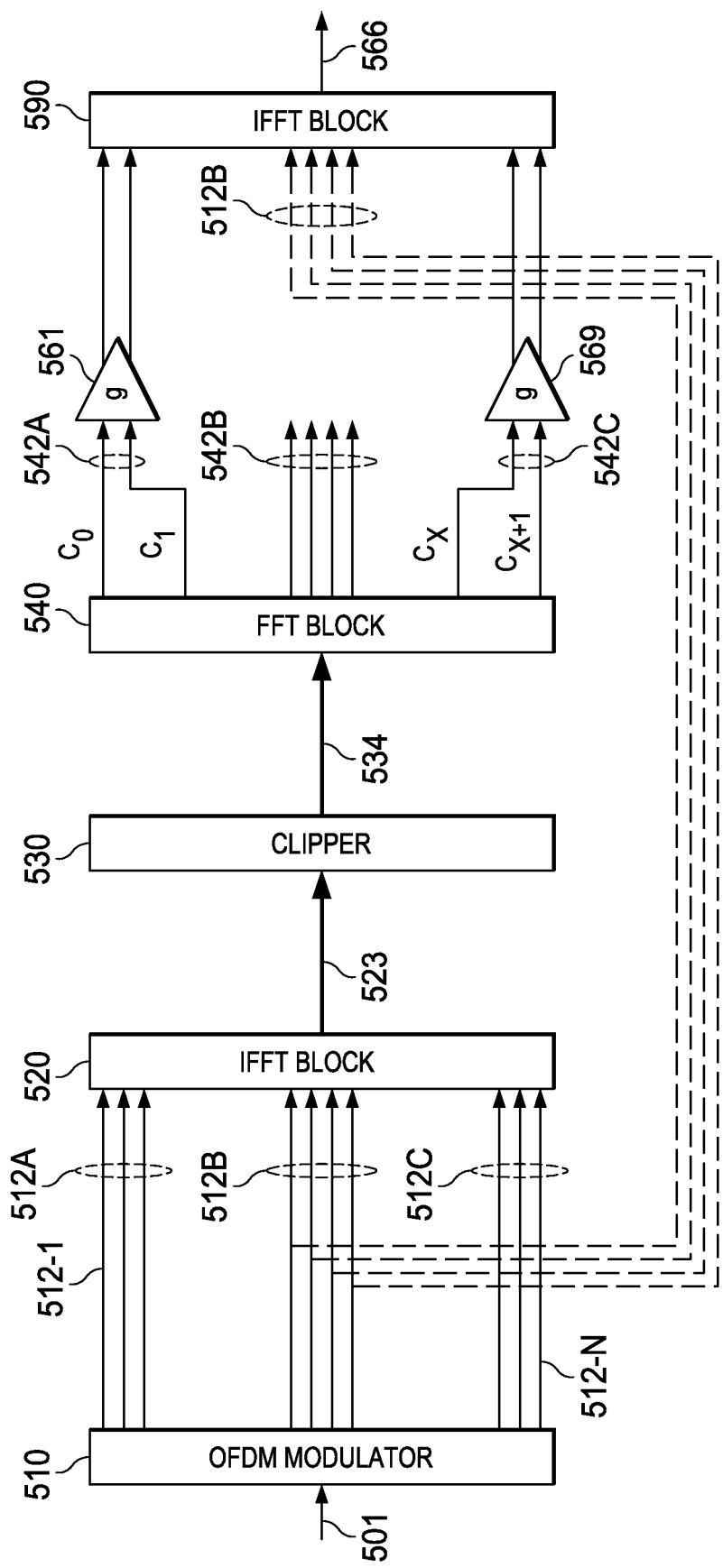
FIG. 5 is a block diagram illustrating the manner in which the PAR of an OFDM signal is reduced in one embodiment.

FIG. 5 is a block diagram illustrating the manner in which the PAR of an OFDM signal is reduced in one embodiment. FIG. 5 shows an OFDM modulator 510, IFFT block 520 and 590, a clipper 530, an FFT Block 540, and amplifiers 561 and 569. Each block is described in further detail below.

OFDM modulator 510 provides an OFDM signal containing N mutually orthogonal subcarriers 512-1 through 512-N. The group of subcarriers 512B is modulated by data and hence carries data. In one embodiment, a serial data stream is converted to parallel data streams (not shown) and each subcarrier may be modulated by a corresponding data stream. The OFDM modulator 510 may modulate a set of subcarriers 512B using a selected modulation scheme such as BPSK, QPSK, ASK, MSK, etc. to encode data.

The groups of subcarriers 512A and 512C are not used for carrying data and referred to as unused subcarriers or guard tones. The signal power is set to zero for the unused subcarriers. Thus, the frequency band of the unused subcarriers operates as guard-band. Alternatively, the unused subcarriers are used for synchronization, as a reference signal for decoding at the receivers, may carry protocol information in accordance with a communication standard, etc. The OFDM modulator 510 may be implemented using any known techniques.

IFFT block 520 is configured to convert the set of frequency tones 512-1 through 512-N to time-domain signal samples. In one embodiment, the time-domain OFDM signal is represented as:

$$x(t) = \sum_{k=0}^{N-1} X_k e^{j2\pi k \Delta ft} \quad (1)$$

in which Δf is the spacing between the sub carriers in the frequency-domain. The overall range of summation N may also be represented as k=−N/2 to k=+(N/2)−1. The PAR of the signal x(t) may be represented as ratio of the maximum instantaneous power of the signal to the average power of the signal and may be represented as:

$$PAR = 10 * \log_{10}\left(\frac{\text{Max}|x(t)|^2}{E(|x(t)|^2)}\right) \quad (2)$$

In which the symbol * represents the multiplication operation, symbol | | represents the "absolute value", the term Max represents the "maximum of", and the term E represents the "average of". The IFFT block 520 may be implemented using any known technique.

The clipper 530 is configured to clip the OFDM signal received on path 523 at a threshold level. In one embodiment, the clipper 530 is implemented, for example, on a digital processor. As an example, the clipper 530 is configured to compare each sample value with a threshold level and set the sample equal to the threshold level if the sample value exceeds the threshold level. The operation of the clipper 530 may be represented as:

$$x_{out} = \begin{cases} |x|e^{j\theta}, \text{ for } |x| < c \\ ce^{j\theta}, \text{ for } |x| \geq c \end{cases} \quad (3)$$

In which $x_{out}$ is the output of the clipper 530 in the time-domain, c is threshold level and θ is phase of the signal. Alternatively, the clipper 530 may be implemented as a circuit comprising diodes and capacitors and may be configured to clip or limit the analog signal amplitude to a desired voltage level. As a further alternative, the PAR may be reduced by considering the Root-Mean-Square (RMS) power or RMS amplitude of OFDM signal. The threshold level may be set at certain decibel (dB) value above or below the RMS. For example, if the OFDM signal is determined to exceed that threshold, the signal is clipped. The clipped OFDM signal is provided on path 534.

FFT block 540 converts the clipped OFDM signal received from path 534 from the time-domain to frequency-domain. In one embodiment, the clipped OFDM signal is passed through a K point FFT (in which K is a selected value of, for example, 64, 128 256 . . . , or in which K may be set to N) that is configured to convert the clipped OFDM signal into K number of frequency tones. The spacing between the frequency tones Δf is matched with that of OFDM signal 512. For example, if the OFDM signal is spaced at 100 KHz and the frequency tones are at 1 MHz, 1.1 MHz, 1.2 MHz etc., then the clipped frequency tones are also correspondingly matched.

The IFFT block 590 receives a group of subcarriers 512B from the OFDM modulator 510 and the group of subcarriers 542A and 542C from the FFT block 540. The received subcarrier 512B, 542A and 542C is converted to a time-domain OFDM signal 566. In one embodiment, a set of subcarriers 542B of the clipped signal 534 is replaced with a set of OFDM signal tones 512 (received signal). The converted time-domain signal 566 represents the OFDM signal with the reduced PAR. In one embodiment, the frequency components 542A and 542C may be suitably amplified to compensate for the distortion that is removed from 542B by way of replacement. The manner in which the PAR of an OFDM signal may be reduced is further illustrated in FIGS. 6A-6D below with reference to example graphs of signals at various stages of FIG. 5.

Figure 6A:
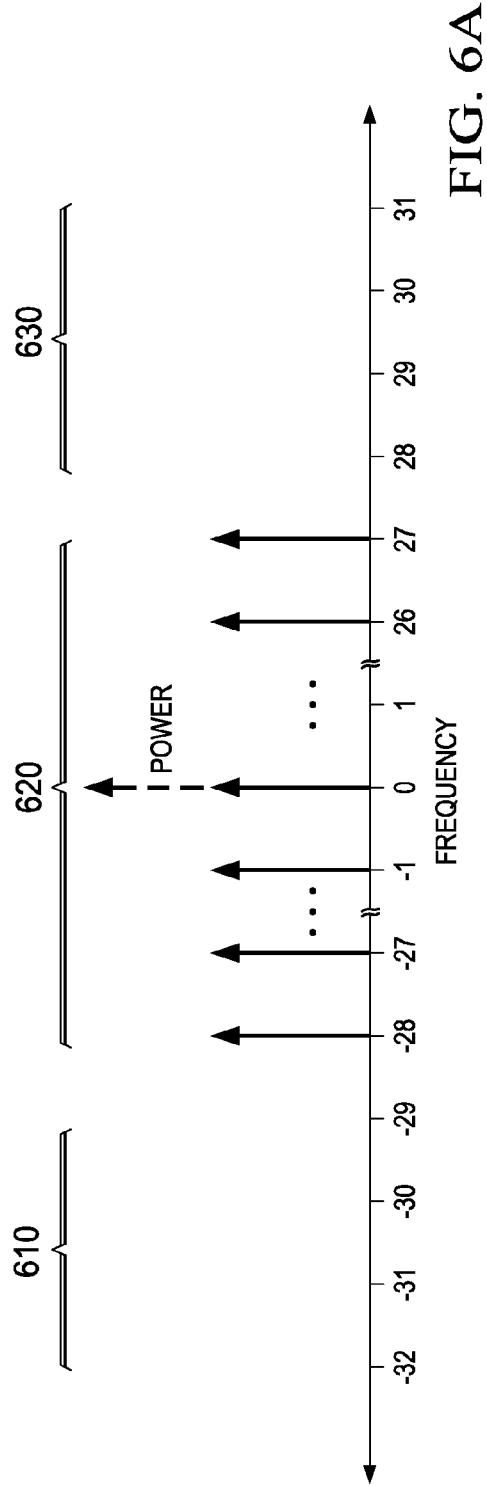

FIG. 6A is a graph representing an example OFDM signal from OFDM modulator 510. The example OFDM signal of FIG. 6A is shown containing 64 subcarriers located from −32 through +31. In one example, the spacing between each subcarriers Δf is set to 312.5 KHz and 64 subcarriers occupy a bandwidth of 10 MHz. Subcarriers 620 at points −28 through +27 are modulated by the data symbols and thus shown with a finite signal power. Such data symbol-modulated subcarriers 620 are referred to as in-band signals. Subcarriers at −32 through −29 (610) and at 28 through 31 (630) are unused and the signal power thereof is set to zero. These unused subcarriers are referred to as "out-of-band signals" or guard tones. The OFDM signal of FIG. 6A may be provided to IFFT block 520.

Figure 6B:
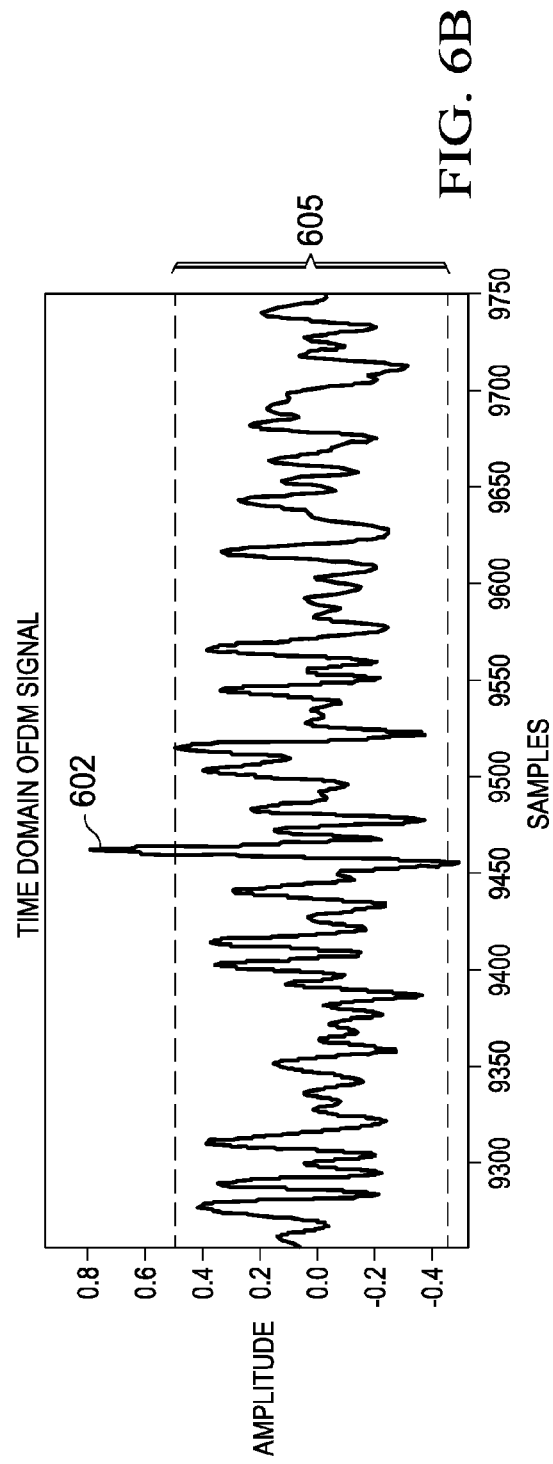

FIG. 6B depicts time-domain samples of the OFDM signal on path 523 resulting from IFFT operation. The example time-domain OFDM signal is shown in FIG. 6B as containing a rare/occasional peak 602. The average signal swing is depicted by range 605. Thus, the OFDM signal of FIG. 6A has high PAR due to peak 602. The time-domain OFDM signal of FIG. 6B is provided to clipper 530.

Figure 6C:
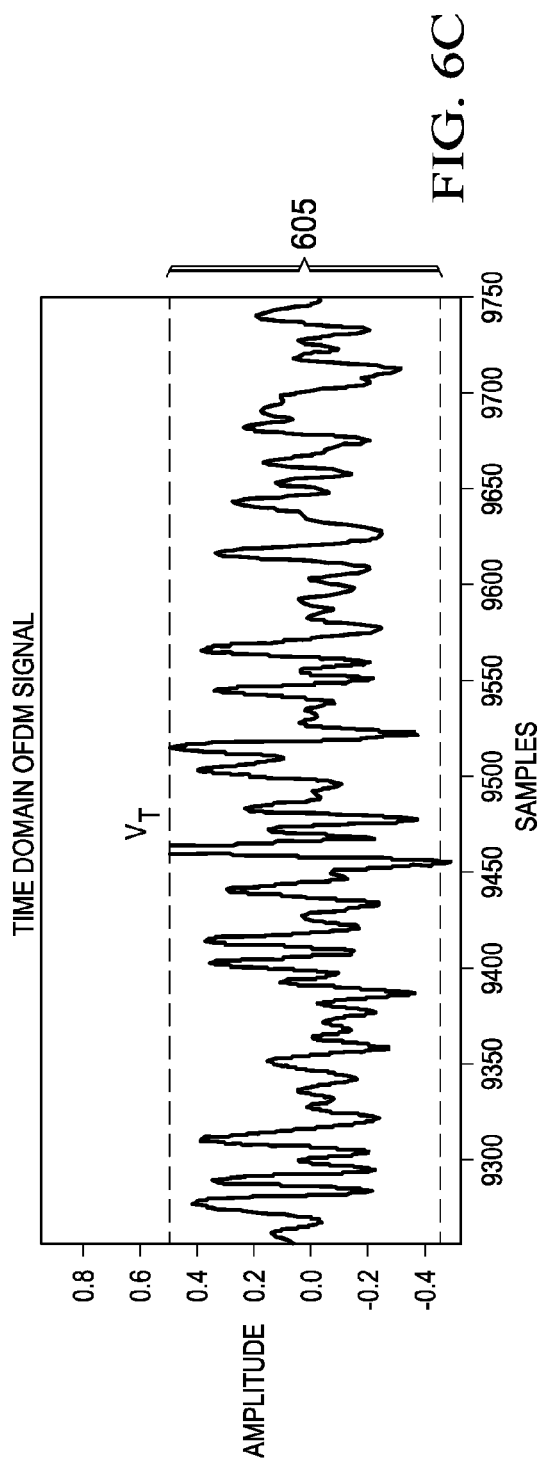

FIG. 6C illustrates an example output of the clipper 530 on path 534 after clipping the peak 602 at a threshold $V_T$. Thus, the resultant signal swing is limited to the range 605, thereby reducing the PAR of the OFDM signal (clipped OFDM signal). The clipped time-domain OFDM signal may be provided to FFT block 540.

Figure 6D:
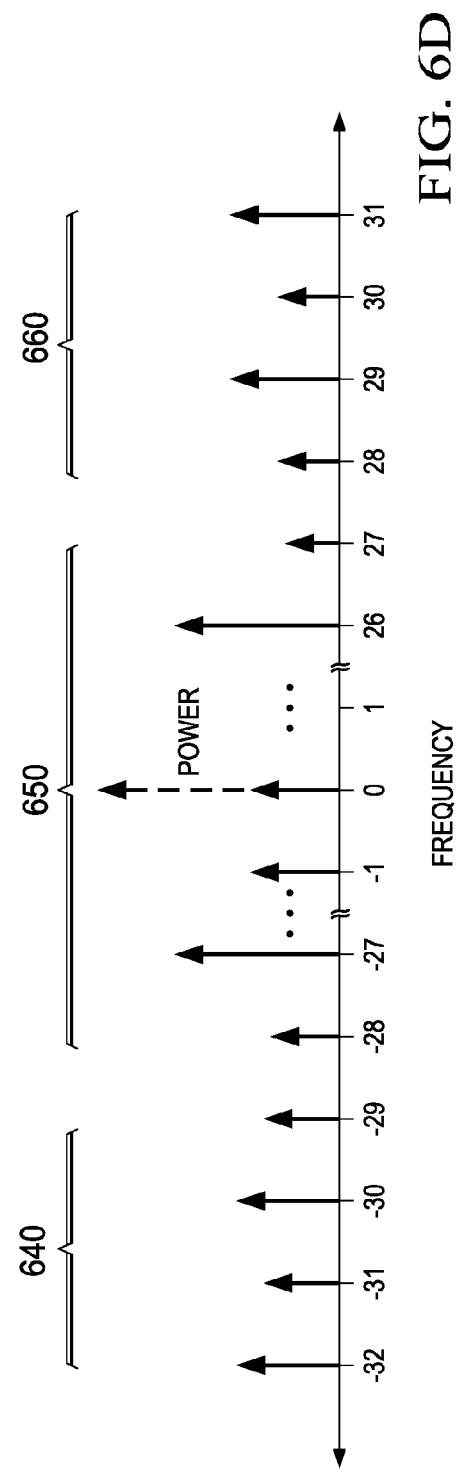

FIG. 6D illustrates the frequency components of an example clipped OFDM signal 640 resulting from a 64-point FFT operation. As mentioned above, FFT block 540 may be implemented with 64, 128 points or more. In an example 128 point FFT implementation, the number of frequency components would change to −64 through +63. Continuing with the 64 point FFT implementation, the transformation produces 64 frequency tones with varying power, amplitude and/or phase.

As shown in FIG. 6D, due to clipping, the amplitude of each frequency tone/component differs from that of the original OFDM signal of FIG. 6A. The frequency tones 650 represent distorted in-band subcarriers of the clipped OFDM signal; the frequency components 640 and 660 represent the guard-band frequency tones of the clipped OFDM signal. It may be appreciated that the distortions occur at both the in-band and guard-band frequency components. The difference between FIGS. 6A and 6D is depicted in FIG. 6E. Thus, FIG. 6E shows the distortion added to the OFDM signal of FIG. 6A due to the clipping operation. In this disclosure, the signal of FIG. 6E or corresponding time-domain signal is referred to as peak cancellation signal.

Thus, in one embodiment, a peak cancellation signal is generated for each set of OFDM subcarriers modulated by the corresponding set of symbols, without iterations or feedback. Each frequency component in the peak cancellation signal is selectively amplified and added to the original OFDM signal to generate an OFDM signal with reduced PAR. As a result, the in-band and out-of-band SNR is controlled. The manner in which peak cancellation signal may be generated and used for peak cancellation is further described below.

FIG. 6F shows the OFDM signal formed by replacing the distorted in-band frequency components 650 of FIG. 6D with the in-band frequency components of the original OFDM signal 620. Thus, it may be observed that the frequency components/subcarriers carrying signal is restored and the distortion due to clipping is retained only in the guard-bands 640 and 660. Thus, the signal quality (in-band signal to noise ratio) is enhanced. The OFDM signal of FIG. 6F is provided to the IFFT block 590 for transmission.

In an alternative implementation, the original signal frequency tones are selectively replaced within the guard-band retaining some of the in-band distortion. For example, some of the in-band frequency tones that are used for protocol and synchronisation purposes may be left un-modified and other in-band tones may be selectively replaced or modified. As a further alternative, the distortion of FIG. 6E is selectively amplified/scaled with predetermined amplification/scaling factors and is added to or replaced with the original OFDM signal tones to keep the in-band and out-of-band signal-to-noise ratio (SNR) at the desired level while maintaining the effect of clipping.

Figure 7:
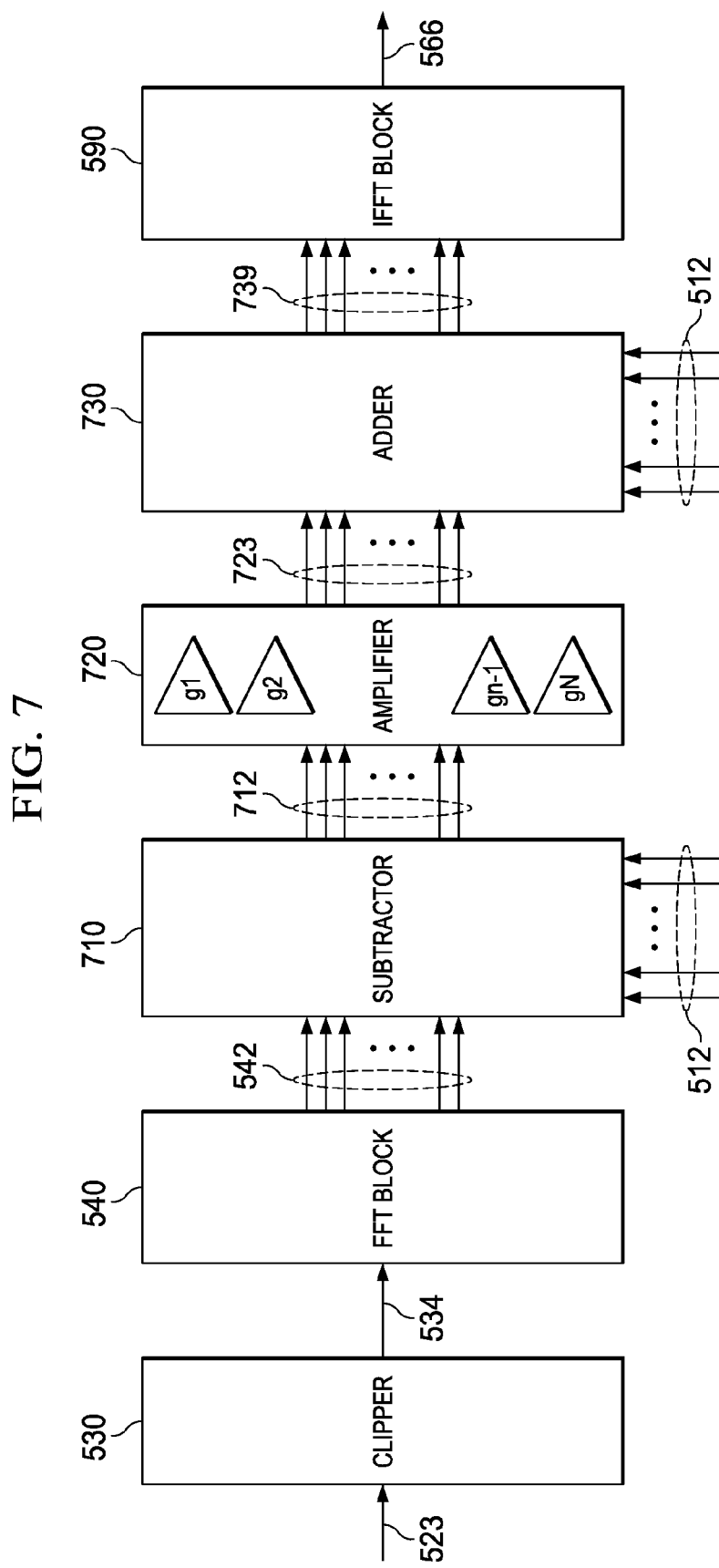
FIG. 7 is a block diagram illustrating the manner in which a peak cancellation signal is generated and added to original OFDM signal, in one embodiment.

FIG. 7 is a block diagram illustrating the manner in which a peak cancellation signal may be generated and added to original OFDM signal, according to one embodiment. As shown, FIG. 7 shows a clipper 530, an FFT block 540, a subtractor 710, a set of amplifiers 720, an adder 730 and an IFFT block 590. Clipper 530, FFT block 540 and IFFT block 590 may operate as described with reference to FIG. 5. Hence the corresponding reference numerals are retained from FIG. 5.

Subtractor 710 is configured to generate a difference signal representative of the difference of the original OFDM signal 512 and the clipped signal 542. The difference signal on path 712 represents the distortion caused due to clipping of the original signal. An example difference signal is illustrated in FIG. 6E. The difference signal is provided to set of amplifiers 720.

The set of amplifiers 720 amplifies/scales each frequency tone of the difference signal with a predetermined gain using corresponding set of amplifier g1-gN. In one embodiment, the gain of the amplifier is set to 0 or to any predetermined value. When the gain of the particular amplifier is set to zero, the distortion of the corresponding frequency tones is also set to zero (i.e., no distortion). Similarly, the gain of amplifier 720 is set to a value that is greater than 1 to amplify the distortion of the particular frequency tones. Alternatively, the gain of amplifier 720 is set to less than 1 to reduce the distortion. Thus, distortion (the difference signal 712) is selectively modified using the set of amplifiers referenced at 720 while controlling the clipping level and the SNR. The selectively modified difference signal is provided to the adder 730 as the peak cancellation signal 723.

In one alternative approach, the gain of the amplifier 720 is set to a desired value by iteratively adjusting the gain until a desired clipping and quality of the signal is obtained. In one embodiment, the gain of the amplifier 720 is determined as function of a characteristic or characteristics of the signal.

Adder 730 adds the peak cancellation signal 723 component to the respective subcarriers by cancelling peaks. The resulting signal is provided to the IFFT block 590. Due to the above approach, a peak cancellation signal is dynamically generated in a feed-forward manner, without iterations or feedback. Thus, the PAR is reduced without causing any delay in the signal processing path. Since standards generally specify requirements on the quality of signal being transmitted, the manner in which the frequency components of the in-band and/or guard-band is selectively modified while complying with various signal quality parameters specified in one or more standards is described in further detail below.

Figure 8:
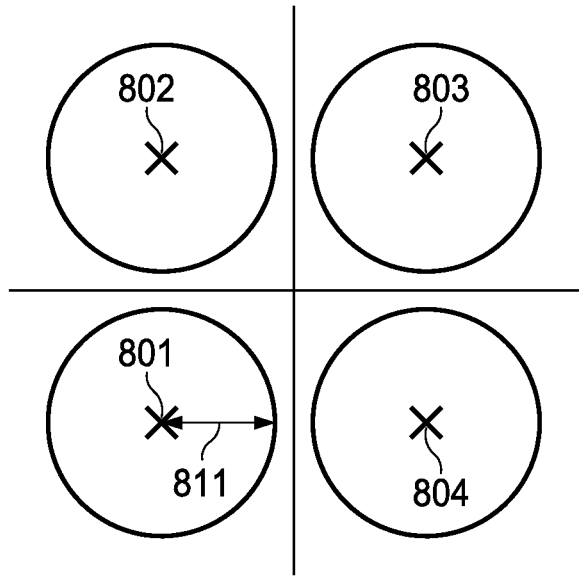
FIG. 8 is an example constellation diagram of a modulation technique, according to one embodiment.

FIG. 8 is an example constellation diagram of a modulation technique that may be utilized in the present embodiments. The constellation diagram of FIG. 8 is shown with four symbol constellation points 801-804 of an example modulation mode/scheme used to encode symbol (such as QPSK modulation scheme). The vector 811 represents the error vector magnitude (EVM). EVM is a measure of signal quality and is generally defined as the difference between the constellation point 801 and the received signal point. Thus, any signal received within the circle formed by vector 811 may be decoded as symbol represented by the point 801.

Therefore, in order to ensure the accurate decoding of symbols, at least in scenarios where the symbols are encoded using a greater number of constellation points, a low EVM is desirable. In order to ensure low EVM, a higher SNR of the in-band signal is required. Accordingly, in one embodiment, for an OFDM signal encoded with higher constellation points such as 16, 64 QAM techniques, distorted in-band tones 650 of the clipped signal is replaced with the in-band tones 620 of the original OFDM signal to enhance the SNR for OFDM signal.

In one embodiment, an OFDM modulator 510 provides an original OFDM signal encoded according to, for example, the 802.11n standard. The 802.11n OFDM signal is converted to time-domain samples. The clipper 530 clips the 802.11n OFDM signal at a threshold set at, for example, 6 dB. The OFDM signal with reduced PAR is formed by replacing the in-band frequency tones of the clipped signal with the original in-band frequency tones. The amplifier 561 and 569 are set to amplify out-of band distortion of the clipped signal by a factor 1.4 to compensate for the distortion removed from the in-band frequency tones. As a result, a 2 dB reduction in PAR may be achieved.

Figure 9:
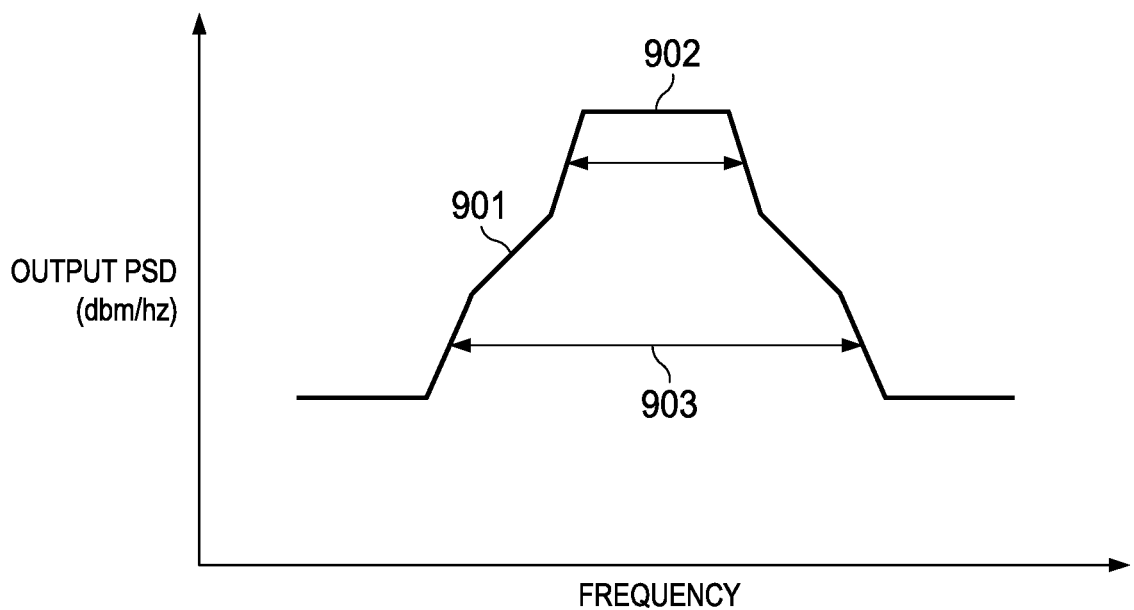
FIG. 9 is an example power spectral density (PSD) of the signal, in one embodiment.

FIG. 9 is an example power spectral density (PSD) of the signal. The envelope 901 depicts the limit on the power of frequency components in the transmitted signal. As shown, reference 902 denotes the maximum power level of an in-band signal and 903 denotes the maximum power level of the guard-band. The envelope 901 is also referred to as MASK. The mask is specified in the communication standards such as WLAN (802.11a/b/n/g). Thus, a transmitter transmitting a signal in accordance with the standard ensures that transmitted signal complies with the mask 901.

Accordingly, the distortion due to clipping in the out-of-band frequency tones may be amplified only to the limit 903 specified in the standards. Thus, in scenarios where the symbols are modulated with fewer constellation points (such as BPSK, QPSK), the distorted in-band frequency tones 650 is retained and the distorted out-of-band frequency tones 640 and 660 is replaced with the original guard-band tones 610 and 630. As a further alternative, the out-of-band distortions 640 and 660 is scaled down and distorted in-band tones 650 is retained or amplified to form a low PAR OFDM signal. Thus, the mask may comply with the requirements specified by the applicable communication/transmission standard.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. A method comprising:
   Orthogonal frequency division multiplexed (OFDM) modulating a first signal having a first peak-to-average ratio (PAR) to provide a first central band of subcarriers, a first band of unused subcarriers, and a second band of unused subcarriers, the first and second bands of unused subcarriers being on either side of the first central band of subcarriers;
   clipping the first signal at a threshold level to generate a clipped signal;
   forming from the clipped signal a second central band of subcarriers, a third band of unused subcarriers, and a fourth band of unused subcarriers, the third and fourth bands of unused subcarriers being on either side of the second central band of subcarriers; and
   forming a second signal with a second PAR, which is less than the first PAR, from the third and fourth bands of unused subcarriers and substituting the first central band of subcarriers for the second central band of subcarriers.

2. The method of claim 1, including:
   converting the first central band of subcarriers, the first band of unused subcarriers, and the second band of unused subcarriers into a time-domain OFDM signal;
   clipping the time-domain OFDM signal at the threshold level; and
   converting the clipped time-domain OFDM signal into the second central band of subcarriers, the third band of unused subcarriers, and the fourth band of unused subcarriers.

3. The method of claim 1, including forming the first central band of subcarriers to be a set of in-band subcarriers carrying data.

4. The method of claim 1, including forming the first and second bands of unused subcarriers to be out of band subcarriers used as any one of guard bands, synchronization signals, reference signals, or protocol information.

5. An orthogonal frequency division multiplexed (OFDM) transmitter comprising:
   an OFDM modulator configured to generate a first OFDM signal with a first peak-to-average ratio (PAR), the OFDM signal including a first plurality of frequency tones that includes first central tones carrying data, a first guard band of tones, and a second guard band of tones, the first and second guard bands of tones being on either side of the first central band of tones;
   a first inverse fast Fourier transformer configured to transform the first plurality of frequency tones to a time-domain signal;
   a clipper configured to provide a clipped signal by clipping the time-domain signal at a desired threshold level;
   a fast Fourier transformer configured to transform the clipped signal to second plurality of frequency tones that includes second central tones carrying data, a third guard band of tones, and a fourth guard band of tones, the third and fourth guard bands of tones being on either side of the second central band of tones;
   a first set of amplifiers configured to amplify the third and fourth guard bands of tones; and
   a second inverse fast Fourier transformer configured to transform the amplified third and fourth guard bands of tones and the first central tones, substituted for the second central tones, to a second OFDM signal with a second PAR, in which the second PAR is less than the first PAR.

6. The transmitter of claim 5 including a processor that effects at least one of the OFDM modulator, the first inverse fast Fourier transformer, the clipper, the fast Fourier transformer, and the second inverse fast Fourier transformer.

* * * * *